United States Patent
Russ et al.

(10) Patent No.: US 7,360,233 B2
(45) Date of Patent: Apr. 15, 2008

(54) BROADCAST CAROUSEL SYSTEM ACCESS FOR REMOTE HOME COMMUNICATION TERMINAL

(75) Inventors: Samuel H. Russ, Lawrenceville, GA (US); Michael A. Gaul, Lawrenceville, GA (US); Anthony J. Wasilewski, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 183 days.

(21) Appl. No.: 10/235,201

(22) Filed: Sep. 5, 2002

(65) Prior Publication Data

US 2004/0049790 A1 Mar. 11, 2004

(51) Int. Cl.
*H04N 5/445* (2006.01)
*H04N 7/163* (2006.01)

(52) U.S. Cl. .......................... 725/118; 39/48
(58) Field of Classification Search ........... 725/49, 725/39, 48, 118
See application file for complete search history.

(56) References Cited

U.S. PATENT DOCUMENTS

| | | | |
|---|---|---|---|
| 5,883,677 A * | 3/1999 | Hofmann | 348/584 |
| 6,536,041 B1 * | 3/2003 | Knudson et al. | 725/39 |
| 2002/0010936 A1 | 1/2002 | Adam | 725/91 |
| 2002/0019984 A1 * | 2/2002 | Rakib | 725/111 |
| 2002/0059637 A1 * | 5/2002 | Rakib | 725/119 |
| 2002/0108121 A1 * | 8/2002 | Alao et al. | 725/110 |
| 2003/0009763 A1 * | 1/2003 | Crinon et al. | 725/92 |
| 2003/0159157 A1 * | 8/2003 | Chan | 725/151 |

FOREIGN PATENT DOCUMENTS

| | | |
|---|---|---|
| EP | 1028551 | 8/2000 |
| EP | 107600 | 6/2001 |
| WO | WO 99/35844 | 7/1999 |
| WO | WO 99/65244 | 12/1999 |
| WO | WO 01/56286 | 8/2001 |

* cited by examiner

*Primary Examiner*—Hunter B. Lonsberry (57) ABSTRACT

Systems and methods are disclosed for providing objects to a remote digital home communication terminal (remote DHCT) via a gateway device located at a customer premises. One such method, among others, includes receiving a message from a remote DHCT requesting a carousel object, receiving the carousel object from a server device, and transmitting the carousel object to the remote DHCT.

48 Claims, 7 Drawing Sheets

BROADCAST CAROUSEL SYSTEM ACCESS FOR REMOTE HOME COMMUNICATION TERMINAL

FIELD OF THE INVENTION

This invention relates in general to subscriber television systems and, more particularly, to the field of broadcast carousel systems.

DESCRIPTION OF THE RELATED ART

Cable television systems are now capable of providing many services in addition to analog broadcast video. In implementing enhanced programming, the home communication terminal ("HCT"), otherwise known as the set-top box, has become an important computing device for accessing various video services. In addition to supporting traditional analog broadcast video functionality, digital HCTs (or "DHCTs") now also support an increasing number of two-way digital services such as video-on-demand.

A DHCT is typically connected to a communications network (e.g., a cable or satellite television network) and includes hardware and software necessary to provide various services and functionality. Preferably, some of the software executed by a DHCT is downloaded and/or updated via the communications network. Each DHCT also typically includes a processor, communication components and memory, and is connected to a television or other display device. While many conventional DHCTs are stand-alone devices that are externally connected to a television, a DHCT and/or its functionality may be integrated into a television or other device, as will be appreciated by those of ordinary skill in the art.

Some customer premises may feature a primary DHCT that is connected to a communications network and a secondary DHCT that is not directly connected to such network. In such customer premises, the primary DHCT may receive a video stream from the communications network and may forward it to the secondary DHCT via a wired or wireless connection. The secondary DHCT may be, for example, a portable device that includes a display screen for displaying television presentations. The secondary DHCT may only be able to provide a user with limited television services as compared to a primary DHCT. For example, the secondary DHCT may be unable to provide a user with an interactive program guide (IPG). Such limitation in the scope of television services may be due, for example, to the secondary DHCT's more limited memory and computing resources and/or to the limited bandwidth of the connection between the two terminals. One possible solution for increasing the scope of services provided by a secondary DHCT may be to increase its memory and computing resources. Another possible solution may be to increase the bandwidth of the connection between the primary and secondary DHCTs. However, such solutions are not cost effective. Therefore, there exists a need for cost effective systems and methods that address the above problems and/or other problems associated with secondary DHCTs.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Preferred embodiments of the invention can be understood in the context of a subscriber television system. In one embodiment of the invention, a gateway device located at a customer premises provides a remote DHCT with access to carousel objects that are broadcast repeatedly (e.g., cyclically) and unilaterally (i.e., not in response to requests for the carousel objects) by a broadcast carousel system (BCS) server over a communications network. The gateway device may itself be a DHCT that is configured to provide television services via a television set to which the gateway device is coupled.

A carousel object that is provided by the gateway device to the remote DHCT may include data and/or software. For example, a carousel object may include information about a broadcast schedule for television presentations. Such information may be used by a remote DHCT to provide an interactive program guide (IPG) to a user.

After receiving a request for a carousel object from the remote DHCT, the gateway device receives the carousel object and forwards it to the remote DHCT. In this manner, the remote DHCT does not need to store large amounts of data. Instead, data may be provided to the remote DHCT as needed for providing a certain service. Furthermore, by providing a remote DHCT with selected carousel objects as needed by the remote DHCT, a lower bandwidth connection (wired or wireless) between the gateway device and remote DHCT may be sufficient to sustain services provided by the remote DHCT.

Figure 1:
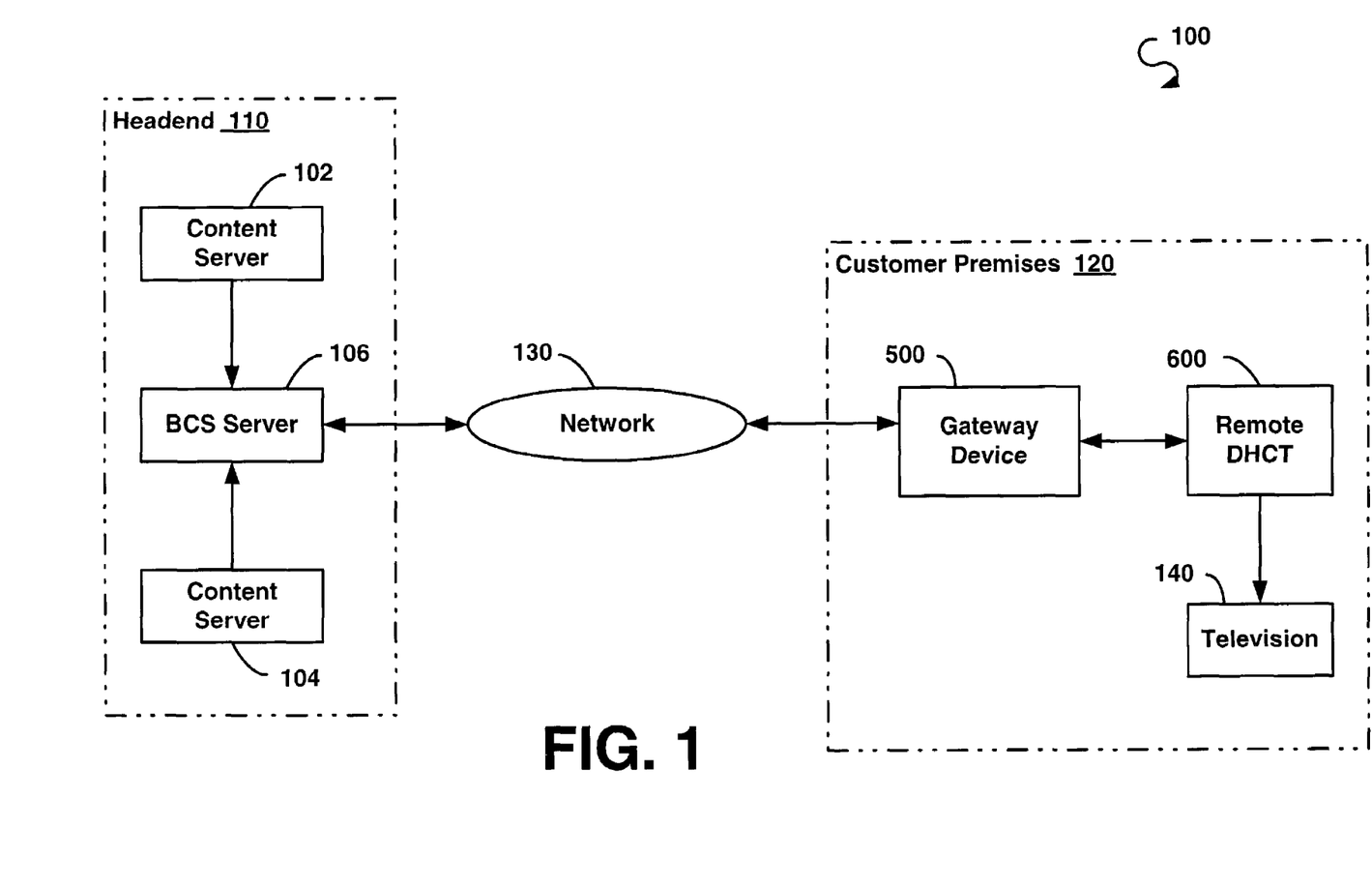
FIG. 1 is a block diagram depicting a television services system in accordance with one embodiment of the invention.
Figure 5:
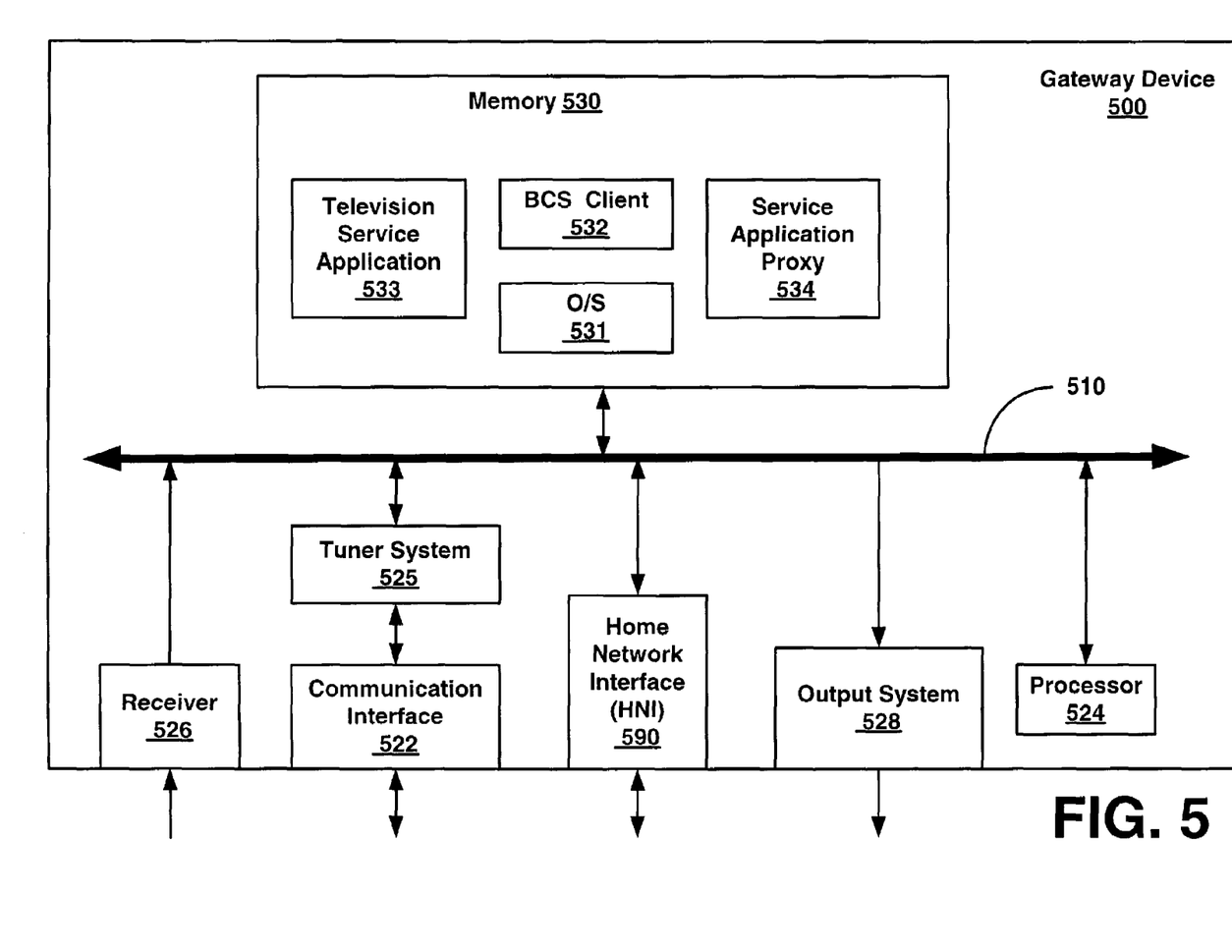
FIG. 5 is a block diagram depicting selected components of the gateway device shown in FIG. 1 in accordance with one embodiment of the invention.
Figure 6:
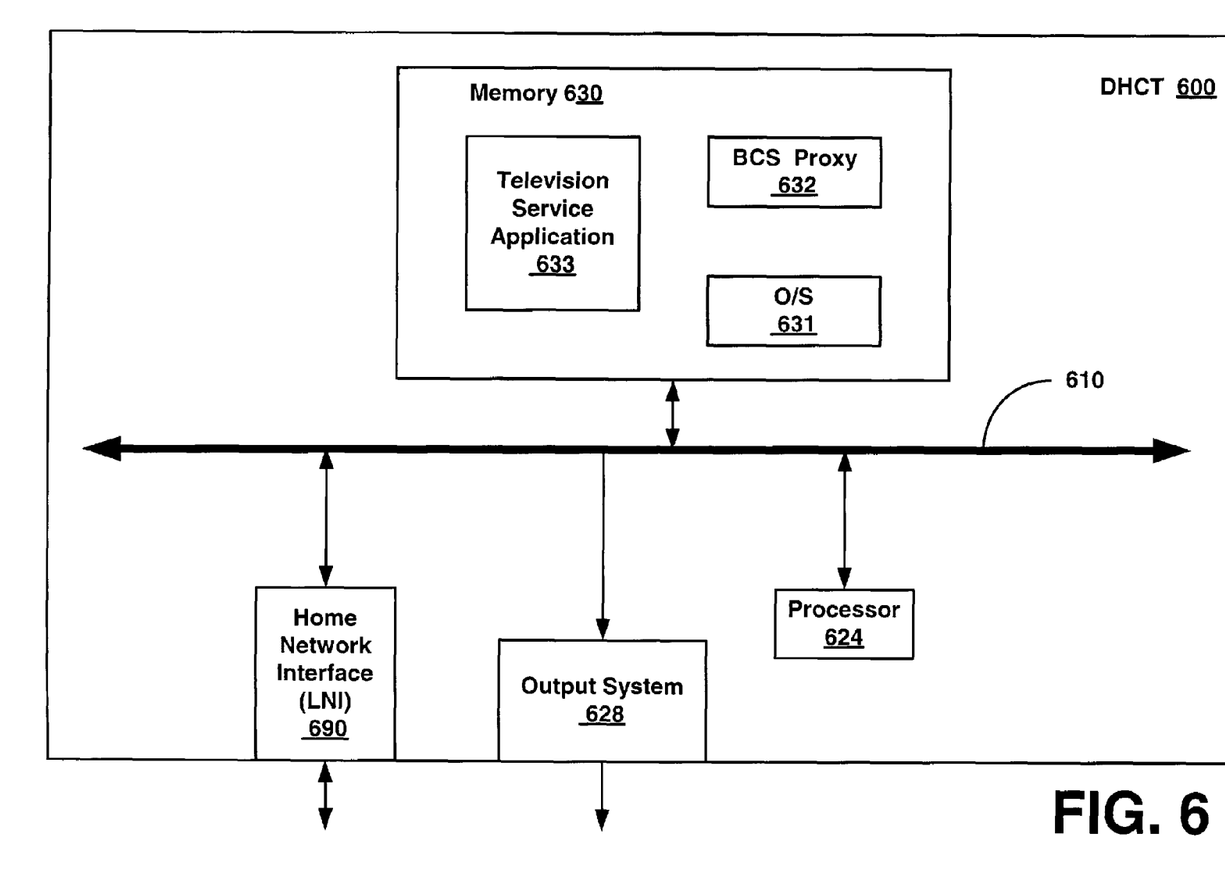
FIG. 6 is a block diagram depicting selected components of the remote DHCT shown in FIG. 1 in accordance with one embodiment of the invention.
Figure 7:
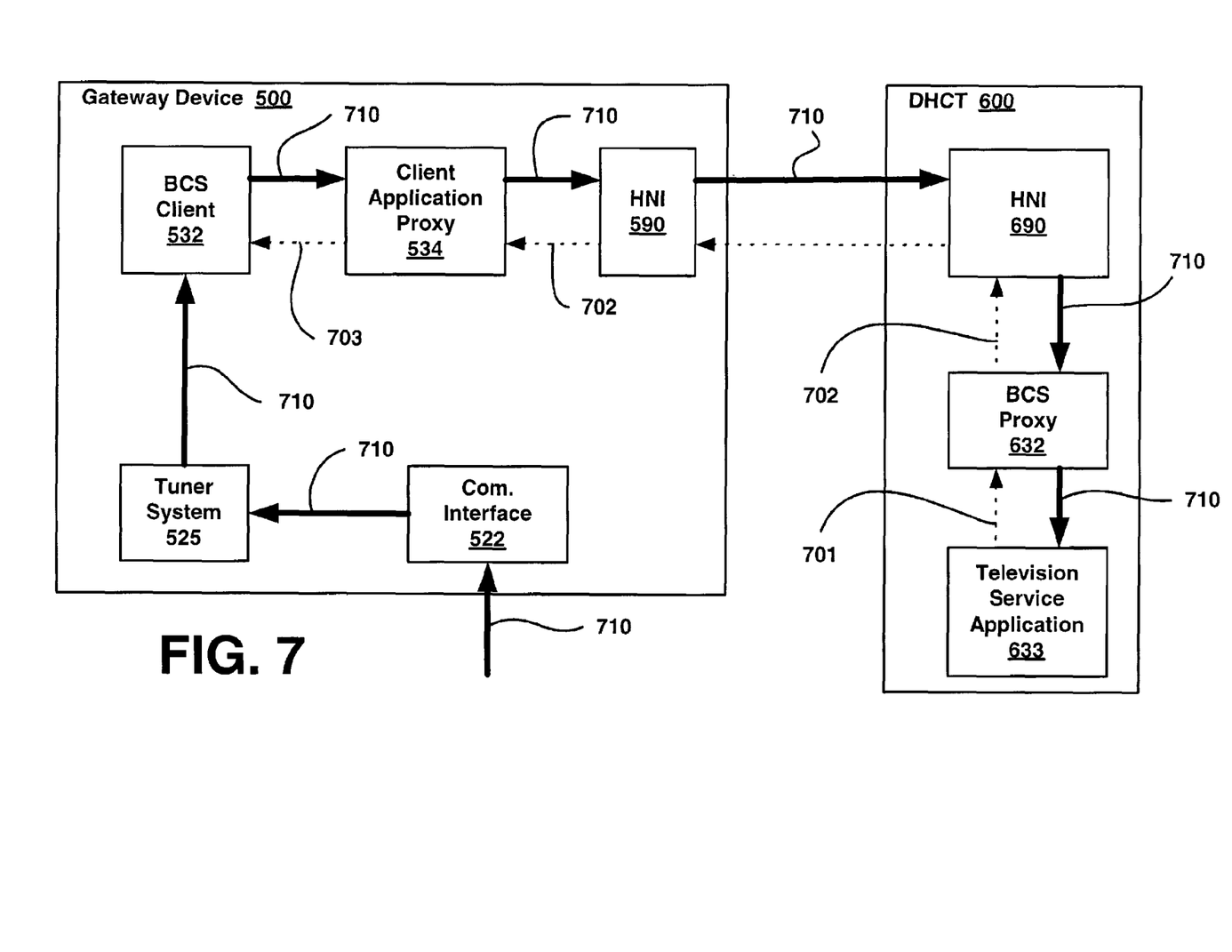
FIG. 7 is a block diagram depicting interactions between selected modules of the gateway device and the remote DHCT shown in FIGS. 5 and 6, respectively, in accordance with one embodiment of the invention.

In the description that follows, FIG. 1 will provide an example of a system that may be used to implement a BCS. Examples of methods for accessing a BCS by a remote DHCT are illustrated in the flow charts of FIGS. 2-4. Finally, system components that may be used to help implement a BCS access method are illustrated in FIGS. 5-7. Note, however, that the invention may be embodied in many different forms and should not be construed as limited to the embodiments set forth herein. Furthermore, all examples given herein are intended to be non-limiting, and are provided in order to help clarify the description of the invention.

Referring to FIG. 1, a television services system 100, according to one embodiment of the present invention, comprises a plurality of servers including a first content server 102 and a second content server 104 coupled to a BCS server 106. Each content server may, in one embodiment, be dedicated to providing certain types of data or software. For example, a content server may be dedicated to providing the latest versions of software applications to gateway devices and/or remote DHCTs. The BCS server 106 is also coupled to a communications network 130. One or more of the plurality of servers may also be coupled to the communications network 130. The communications network 130 transports data available from the plurality of servers to a gateway device 500. The gateway device 500 may be a DHCT that is configured to provide television services via a television (not shown) to which the gateway device 500 is coupled. In an alternative embodiment, the gateway device 500 may be dedicated to providing carousel objects to one or more remote DHCTs 600 located at the customer premises 120.

The BCS server 106 repeatedly broadcasts carousel objects over the communications network 130. Such repetitive broadcasts are preferably made unilaterally, i.e., not in response to requests for the objects. In one embodiment, the gateway device 500 receives selected carousel objects broadcast by the BCS server 106 and provides them to a remote DHCT 600 in response to a request from the remote DHCT 600. The remote DHCT 600 uses the objects received from the gateway device 500 to provide television services via a television 140.

The repetitive data broadcasts by the BCS server 106 may be achieved using, for example, a broadcast data carousel mechanism that is defined in the Digital Storage Media Command and Control (DSM-CC) specification ISC/IEC 13818-6 IS. The DSM-CC standard was developed for the delivery of multimedia services and includes several protocol areas addressing different application needs. In one possible implementation, the BCS server 106 uses a DSM-CC User-to-User Object Carousel protocol to broadcast objects.

Figure 2A:
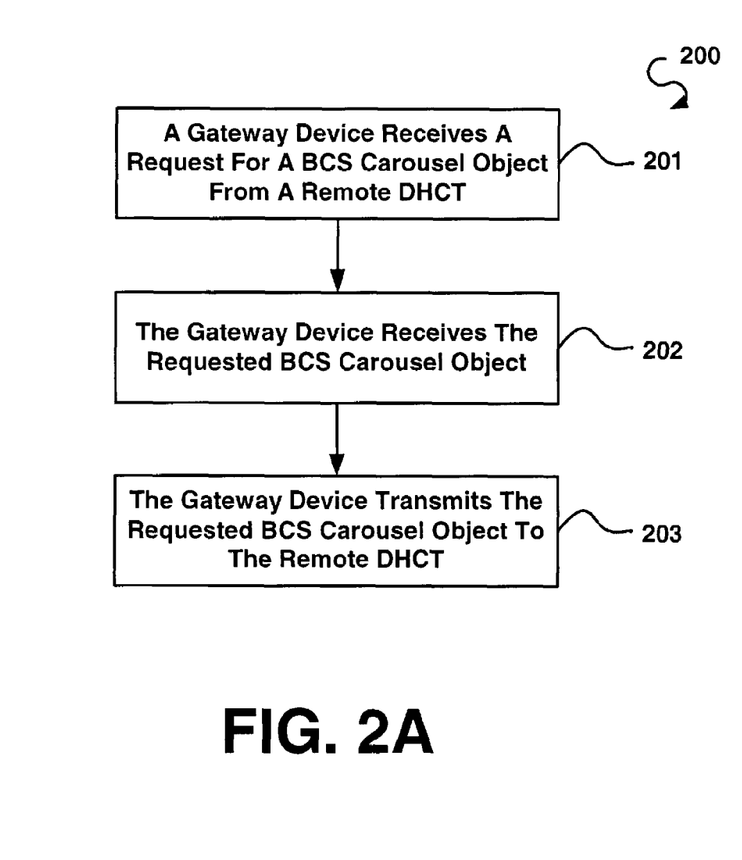
FIG. 2A is a flow chart depicting a non-limiting example of a broadcast carousel system (BCS) access method that is implemented by a gateway device shown in FIG. 1, in accordance with one embodiment of the invention.

FIG. 2A is a flow chart depicting a non-limiting example of a BCS access method 200 that is implemented by a gateway device 500 (FIG. 1) in accordance with one embodiment of the invention. As indicated in block 201, a gateway device 500 receives a request for a carousel object from a remote DHCT 600 (FIG. 1). The requested carousel object is repeatedly (e.g., cyclically) broadcast by a BCS server 106 or a content server 102 or 104 (FIG. 1) to the gateway device 500 via a communications network 130 (FIG. 1). The communications network may be, for example, a cable television network or a satellite television network, among others. In one embodiment, the object is repeatedly broadcast over a plurality of communication channels. After receiving the request for the carousel object, the gateway device 500 receives the requested carousel object (block 202) and transmits it to the remote DHCT 600 (block 203). The requested object may have been broadcast to the gateway device 500 by a BCS server 106.

In one embodiment, the gateway device 500 edits a carousel object prior to transmitting it to the remote DHCT 600. A carousel object may be edited for various reasons including, for example, the following:

a) to help restrict access by the remote DHCT 600 to only data to which the remote DHCT 600 is authorized to receive;
b) to provide the remote DHCT 600 with data that is in a format that is better suited for one or more software applications that are running on the remote DHCT 600; and/or
c) to provide the remote DHCT 600 with data that is in accordance with user defined settings such as, for example, parental control settings.

Figure 2B:
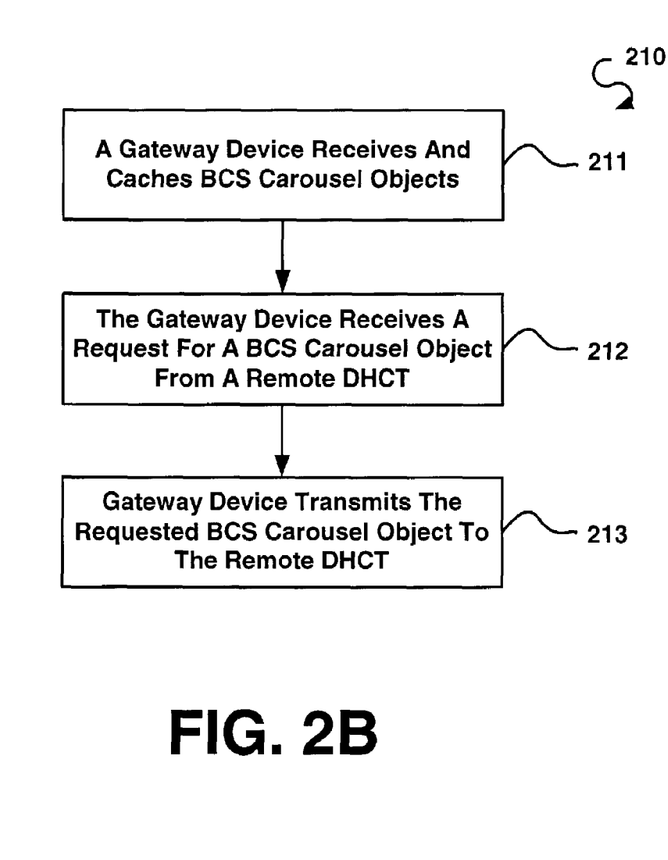
FIG. 2B is a flow chart depicting a non-limiting example of a BCS access method that is implemented by a gateway device shown in FIG. 1, in accordance with another embodiment of the invention.

FIG. 2B is a flow chart depicting a non-limiting example of a BCS access method 210 that is implemented by a gateway device 500 (FIG. 1) in accordance with another embodiment of the invention. As indicated in block 211, a gateway device 500 receives and caches objects that have been broadcast via the communications network 130 (FIG. 1). Subsequently, the gateway device 500 receives (block 212) a request for a carousel object from a remote DHCT 600. In response to receiving the request, the gateway device 500 transmits (block 213) the requested carousel object to the remote DHCT 600.

Figure 3:
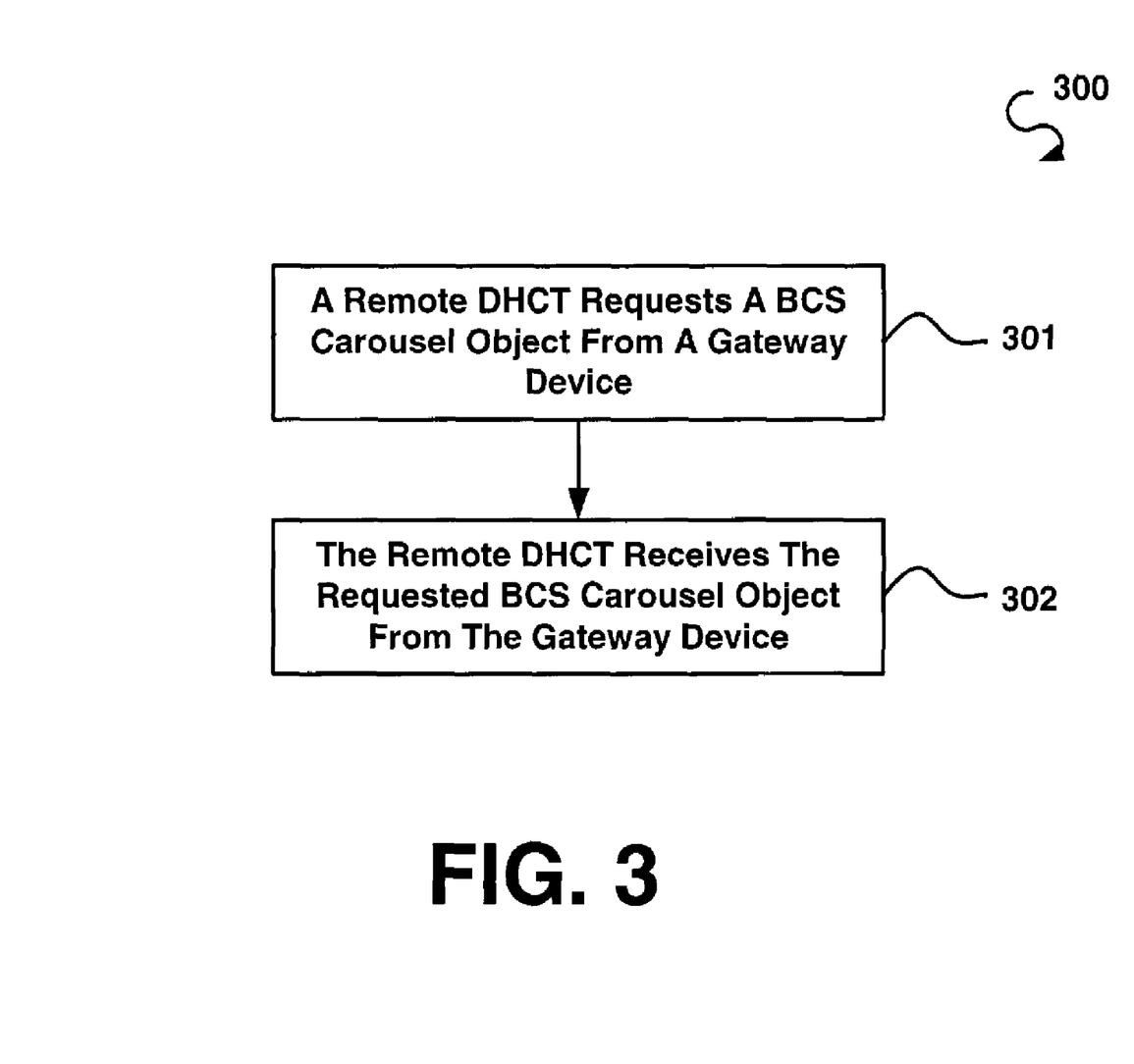
FIG. 3 is a flow chart depicting a non-limiting example of a BCS access method that is implemented by a remote DHCT shown in FIG. 1, in accordance with one embodiment of the invention.

FIG. 3 is a flow chart depicting a non-limiting example of a BCS access method 300 that is implemented by a remote DHCT 600 (FIG. 1) in accordance with one embodiment of the invention. As indicated in block 301, the remote DHCT 600 requests a carousel object from a gateway device 500. Then, as indicated in block 302, the remote DHCT 600 receives the requested carousel object from the gateway device 500. As discussed above, the requested carousel object may be repeatedly broadcast by a BCS server 106 or an application server 102 or 104 (FIG. 1) to the gateway device 500 via a communications network 130 (FIG. 1).

Figure 4:
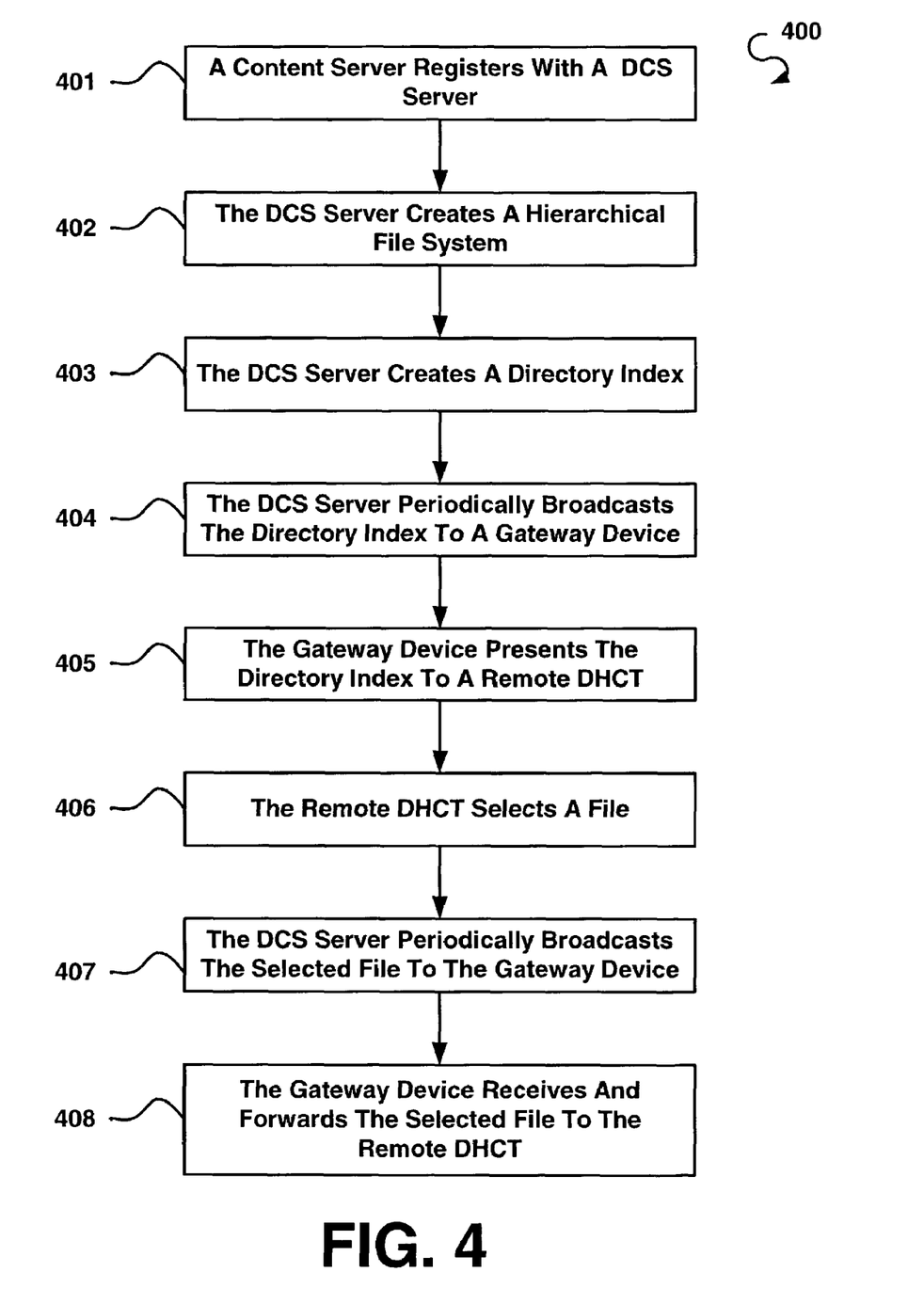
FIG. 4 is a flow chart illustrating a data carousel method in accordance with one possible embodiment of the invention, among others.

FIG. 4 is a flow chart illustrating a data carousel method 400 in accordance with one possible embodiment of the invention, among others. When a content server wishes to broadcast data via the communications network 130, the content server initially registers (block 401) with the BCS server 106. The BCS server 106 then creates a hierarchical file system (block 402) with all respective data available from each content server that is registered with the BCS server 106.

The BCS server 106 may start with a home directory such as, for example, "\BCS\", and each content server that has registered with the BCS server 106 may be assigned a respective directory in this hierarchical file system. For example, if the first content server 102 and the second content server 104 register with the BCS server 106, then, a first directory "\BCS\first content server\" under the home directory "\BCS\" may be created for the first content server 102, and a second directory "\BCS\second content server\" under the home directory "\BCS\" may be created for the second content server 104.

The first content server 102 and the second content server 104 may also create subdirectories under their respective directories. For example, the first content server may create a subdirectory "\BCS\first content server\first subdirectory\." Additionally, a content server may create and maintain a file under the respective directory for that server. For example, the first content server 102 may create a file under its respective directory (e.g., "\BCS\first content server\first file") or under a subdirectory (e.g., "\BCS\first content server\first subdirectory\first file").

The BCS server 106 creates a directory index (block 403) of all data available from the plurality of servers wishing to broadcast such data to the gateway device 500 via the communications network 130. This directory index is repeatedly broadcast (block 404) to the gateway device 500 via the communications network 130 by the BCS server 106 to inform the gateway device 500 of data that is available from the plurality of servers. A directory index may include channel information indicating where particular data may be transported when the communications network 130 includes multiple channels. Each content server may add any data to be broadcast to the gateway device 500 under a respective directory assigned to that server by the BCS server 106.

The directory index is updated as new servers register with the BCS server 106, as old servers unregister with the BCS server 106, and as each content server modifies the contents under its respective directory. For example, when a content server no longer wishes to broadcast any data via the communications network 130, that server may unregister with the BCS server 106 to remove the respective directory for that server from the directory index. In addition to creating and modifying subdirectories and files under a respective directory assigned by the BCS server 106, the content servers 102 and 104 may delete subdirectories and files.

Preferably, upon receiving a directory index, the gateway device 500 caches it and subsequently presents it (block 405) or a portion thereof to the remote DHCT 600 in response to a request from the remote DHCT 600. The remote DHCT 600 selects a file (block 406) from the directory index and communicates its selection to the gateway device 500. The BCS server 106 and/or the content servers repeatedly broadcast (block 407) the selected file, among other files, to the gateway device 500. The BCS server 106 may broadcast files using any of a number of possible broadcasting schemes. As a non-limiting example, among others, one scheme may involve broadcasting certain files more frequently than other files. The gateway device 500 receives the data of the selected file from the periodic data broadcasts and forwards it (block 408) to the remote DHCT 600. In this manner, only the portion of data that is requested by the remote DHCT 600 needs to be cached by the gateway device 500 and transmitted to the remote DHCT 600, thereby conserving memory resources of both terminals 500 and 600.

The blocks shown in FIGS. 2-4 represent modules, segments, or portions of code which include one or more executable instructions for implementing specific logical functions or steps in a process. In an alternative implementation, functions or steps depicted in FIGS. 2-4 may be executed out of order from that shown or discussed, including substantially concurrently or in reverse order, depending on the functionality involved, as would be understood by those of ordinary skill in the art.

The functionality provided by the methods illustrated in FIGS. 2-4, can be embodied in any computer-readable medium for use by or in connection with a computer-related system (e.g., an embedded system such as a modem) or method. In this context of this document, a computer-readable medium is an electronic, magnetic, optical, semi-conductor, or other physical device or means that can contain or store a computer program or data for use by or in connection with a computer-related system or method. Furthermore, the functionality provided by the methods illustrated in FIGS. 2-4 can be implemented through hardware (e.g., an application specific integrated circuit (ASIC) and supporting circuitry) or a combination of software and hardware.

FIG. 5 is a block diagram depicting a non-limiting example of a gateway device 500 in accordance with one embodiment of the invention. As shown in FIG. 5, the gateway device 500 is a DHCT that is configured to provide television services via a television (not shown) to which the gateway device 500 is coupled. The gateway device 500 includes a communications interface 522 for receiving signals (video, audio and/or other data) from the headend 110, at least one processor 524 for controlling operations of the gateway device 500, an output system 528 for driving the television 140 (FIG. 1), and a tuner system 525 for tuning to a particular television service to be displayed. The tuner system 525 includes, in one implementation, an out-of-band tuner for bi-directional quadrature phase shift keying (QPSK) data communication and a quadrature amplitude modulation (QAM) tuner (in-band) for receiving television signals. Carousels object that are broadcast by the BCS server (and/or other servers) are preferably received by the out-of-band tuner. In another embodiment, however, carousel objects may be received by the in-band tuner and/or by the out-of-band tuner, depending on a desired implementation. A receiver 526 receives externally-generated user inputs or commands from an input device such as, for example, a remote control device. A home network interface 590 provides a communications interface with a remote DHCT 600 (FIG. 1).

The processor 524, memory 530, output system 528, home network interface 590, receiver 526, and tuner system 525 are coupled to a local interface 510. The local interface 510 can be, for example but not limited to, one or more buses or other wired or wireless connections. The local interface 510 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 524 is a hardware device for executing software, particularly that stored in memory 530. The processor 524 can be any custom made or commercially available processor, a central processing unit (CPU), an auxiliary processor among several processors associated with the gateway device 500, a semiconductor based microprocessor (in the form of a microchip or chip set), or generally any device for executing software instructions. When the gateway device 500 is in operation, the processor 524 is configured to execute software stored within the memory 530, to communicate data to and from the memory 530, and to generally control operations of the gateway device 500 pursuant to the software.

The memory 530 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 530 may incorporate electronic, magnetic, optical, and/or other types of storage media. Note that the memory 530 can have a distributed architecture, where various components are situated remote from one another, but can be accessed by the processor 524.

The software in memory 530 may include one or more separate programs, each of which comprises an ordered listing of executable instructions for implementing logical functions. In the example of FIG. 5, the software in the memory 530 includes a BCS client application 532, a television service application 533, a service application proxy 534, and a suitable operating system (O/S) 531. The BCS client application is responsible for receiving carousel objects that are broadcast over the communications network 130. The television service application 533 provides a user with a specific television service, such as, for example, an interactive program guide. Although the gateway device 500 may include several television service applications, only one such application is shown to simplify the description of the gateway device 500. The service application proxy 534 communicates with the BCS client application 532 on behalf of a television service application running on the remote DHCT 600 (FIG. 1). The operating system 531 essentially controls the execution of other software, and provides scheduling, input-output control, file and data management, memory management, and communication control and related services.

Each of the above applications may be a source program, an executable program (object code), a script, or any other entity comprising a set of instructions to be performed. When an application is a source program, then it may be translated via a compiler, assembler, interpreter, or the like, which may or may not be included within the memory 530, so as to operate properly in connection with the O/S 531. Furthermore, an application can be written as (a) an object oriented programming language, which has classes of data and methods, or (b) a procedure programming language, which has routines, subroutines, and/or functions.

A home network interface 590 is used for forwarding BCS data to a remote DHCT 600 (FIG. 1). The home network interface 590 may comprise, for example, a USB (Universal Serial Bus), an Ethernet port (for connection to a computer), an IEEE-1394 connection, a serial port, a parallel port, a wireless radio frequency (RF) interface, and/or an infra-red (IR) interface. In one possible implementation, the data export interface 590 may be coupled to a client device via an Ethernet hub.

FIG. 6 is a block diagram depicting a non-limiting example of a remote DHCT 600 in accordance with one embodiment of the invention. The remote DHCT 600 includes at least one processor 624 for controlling operations of the remote DHCT 600, a memory 630 for storing data and software programs, and an output system 628 for driving a display device (not shown). This display device may be a stand alone unit or may be integrated with the remote DHCT 600. The remote DHCT 600 also includes a home network interface 690 for providing a communications interface with and for receiving BCS data from a gateway device 500 (FIG. 1). The processor 624, output system 628, memory 630, and home network interface 690 are coupled to a local interface 610.

The software in the memory 630 includes a BCS proxy application 632, a television service application 633, and a suitable operating system (O/S) 631. The BCS proxy application 632 provides the television service application with BCS data. The BCS proxy application 632 receives requests for BCS data from, for example, the television service application 633 and transmits messages to a service application proxy 534 (FIG. 5) in order to obtain the requested BCS data. The BCS proxy application 632 then receives the BCS data from the service application proxy 534 and forwards it to the television service application 633, which may use the data to provide a service to a user. For example, if the television service application 633 provides a user an interactive program guide (IPG), then the requested BCS data may comprise television broadcast schedule information that is presented via the IPG.

In one implementation, the television service application 633 may interact with the BCS proxy application 632 in the same manner that the television service application 533 interacts with the BCS client application 532 (FIG. 5). In other words, the television service application 633 may be identical to the television service application 533, and, therefore, may not need to be specially programmed for the remote DHCT 600.

In another embodiment of the invention, the service application 633 communicates directly with the service application proxy 534 (FIG. 5) in order to request BCS data. In yet another embodiment of the invention, the service application 633 communicates directly with the BCS client application 532 (FIG. 5) in order to request BCS data.

FIG. 7 is a block diagram depicting interactions between selected modules of the gateway device 500 and the remote DHCT 600. When the television service application 633 of the remote DHCT 600 requires a carousel object, it requests the file from the BCS proxy 632 via an application programming interface (API). This request may be performed via, for example, a function call 701. Requests and communications from one application or functional element to another may be performed using other techniques and still be within the scope of the present invention.

A function call is a request by an application to use a function. In general, the function can be large and can perform a significant amount of processing, or it can be as small as computing two numbers and returning the result. When applications are running, they typically make many function calls to the operating system. A function call written in an application typically states the name of the desired function followed by any values or parameters that have to be passed to the function. When the function is called, the function is executed, and the results are returned as variables or pointers with new values. A function may be written within an application, be part of an external library that is combined with the application when it is compiled, or be contained in another application, such as, for example, the operating system.

The function call 701 causes the BCS proxy 632 to transmit a message 702 to the gateway device's service application proxy 534 requesting the BCS data. This message 702 is transmitted via the remote DHCT's home network interface 690, and is received by the gateway device's home network interface 590.

The home network interface 590 forwards this message 702 to the service application proxy 534. After receiving the message 702, the service application proxy 534 requests the carousel object from the BCS client application 532 via an API. This request may be performed via, for example, a function call 703. This function call 703 causes the BCS client 532 to extract the requested carousel object 710 from objects that are received via the communications interface 522. The requested carousel object 710 is then transmitted by the gateway device 500 to the remote DHCT 600 where it is used by the television service application 633.

In an alternative embodiment of the invention, the television service application 633 does not use the BCS proxy 632 to request a carousel object. Instead, the television service application 633 is configured to transmit a message requesting a carousel object to the gateway device 500 via the home network interface 690. This message may be received by the service application proxy 534 or by the BCS client 532, depending on the particular implementation.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions.

It should be emphasized that the above-described embodiments of the present invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims. In addition, the scope of the present invention includes embodying the functionality of the preferred embodiments of the present invention in logic embodied in hardware and/or software-configured mediums.

What is claimed is:

1. A method for providing carousel objects to a remote digital home communication terminal (remote DHCT) via a gateway device, the method comprising:
    receiving at the gateway device a message from the remote DHCT requesting a carousel object;
    receiving at the gateway device the carousel object, wherein the carousel object is repeatedly broadcast using a first protocol to the gateway device by a server device over a communications network;
    converting by the gateway device the carousel object in the first protocol into a second protocol; and
    responsive to the gateway receiving the message requesting the carousel object from the remote DHCT, transmitting by the gateway device the carousel object to the remote DHCT using the second protocol, the remote DHCT being capable of processing the carousel object using the second protocol, wherein the gateway device and the remote DHCT are located at a customer premises.

2. The method of claim 1, wherein the step of receiving the carousel object is performed before the step of receiving the message from the remote DHCT.

3. The method of claim 2, further comprising:
    caching the carousel object prior to the step of receiving the message from the remote DHCT.

4. The method of claim 1, wherein the carousel object comprises software.

5. The method of claim 1, wherein the first protocol is a Digital Storage Media Command and Control (DSM-CC) User-to-User Object Carousel protocol.

6. The method of claim 1, wherein the carousel object is repeatedly broadcast to the gateway device over a plurality of communication channels.

7. The method of claim 1, wherein the communications network is a cable television network.

8. The method of claim 1, wherein the communications network is
    a satellite television network.

9. The method of claim 1, further comprising:
    editing the object prior to the step of transmitting the object.

10. The method of claim 1, further comprising:
    receiving at the gateway device a directory of carousel objects that are available.

11. The method of claim 10, wherein the directory comprises file listings organized in a hierarchical manner.

12. The method of claim 1, wherein the carousel object comprises electronic program guide (EPG) data.

13. A method for providing carousel objects to a remote digital home communication terminal (remote DHCT) via a gateway device, the method comprising:
    receiving at the gateway device a carousel object, wherein the carousel object is repeatedly broadcast using a first protocol to the gateway device by a server device over a communications network;
    converting by the gateway device the carousel object in the first protocol into a second protocol;
    caching the carousel object;
    receiving at the gateway device a message from the remote DHCT requesting the carousel object; and
    transmitting by the gateway device the carousel object to the remote DHCT using the second protocol responsive to the gateway device receiving the message requesting the carousel object, the remote DHCT being capable of processing the carousel object using the second protocol, wherein the gateway device and the remote DHCT are located at a customer premises.

14. A method for receiving carousel objects by a remote digital home communication terminal (remote DHCT) from a gateway device, the method comprising:
    transmitting by the remote DHCT a message to the gateway device requesting a carousel object;
    converting by the gateway device the carousel object from a first protocol into a second protocol; and
    receiving by the remote DHCT the carousel object using the second protocol from the gateway device based on the transmitted message, the remote DHCT being capable of processing the carousel object using the second protocol, wherein the gateway device and the remote DHCT are located at a customer premises.

15. The method of claim 14, wherein the carousel object comprises software.

16. The method of claim 14, wherein the carousel object is repeatedly broadcast to the gateway device.

17. The method of claim 14, wherein the first protocol is a Digital Storage Media Command and Control (DSM-CC) User-to-User Object Carousel protocol.

18. The method of claim 14, wherein the carousel object is repeatedly broadcast to the gateway device over a plurality of communication channels.

19. The method of claim 14, wherein the carousel object is repeatedly broadcast to the gateway device via cable television network.

20. The method of claim 14, wherein the carousel object is repeatedly broadcast to the gateway device via a satellite television network.

21. The method of claim 14, wherein the carousel object comprises electronic program guide (EPG) data.

22. A gateway device comprising:
    logic configured to receive a message from a remote digital home communication terminal (remote DHCT);
    logic configured to convert the carousel object from a first protocol into a second protocol;
    logic configured to determine whether a carousel object is to be transmitted to the remote DHCT based on the received message; and
    logic configured to initiate a transmission of the carousel object using the second protocol from the gateway device to the remote DHCT in response to the logic determining that the carousel object is to be transmitted to the remote DHCT, the remote DHCT being capable of processing the carousel object using the second protocol, wherein the gateway device and the remote DHCT are located at a customer premises.

23. The gateway device of claim 22, further comprising:
    a memory device; and
    a directory that is stored in the memory device and that lists the carousel object as being available.

24. The gateway device of claim 22, wherein the carousel object comprises software.

25. The gateway device of claim 22, wherein the carousel object is repeatedly broadcast to the gateway device.

26. The gateway device of claim 22, wherein the first protocol is a Digital Storage Media Command and Control (DSM-CC) User-to-User Object Carousel protocol.

27. The gateway device of claim 22, wherein the carousel object is repeatedly broadcast to the gateway device over a plurality of communication channels.

28. The gateway device of claim 22, wherein the carousel object comprises electronic program guide (EPG) data.

29. A remote digital home communication terminal (remote DHCT), comprising:

a first software application that is configured to provide a television service using data contained in a carousel object;

a second software application that is configured to request the carousel object from a gateway device and to receive, in response to the request, the carousel object from the gateway device, the gateway device converting the carousel object from a first protocol into a second protocol; and a third software application that is configured to process the carousel object using the second protocol.

30. The remote DHCT of claim 29, wherein the carousel object comprises software.

31. The remote DHCT of claim 29, wherein the carousel object is repeatedly broadcast to the gateway device.

32. The remote DHCT of claim 29, wherein the first protocol is a Digital Storage Media Command and Control (DSM-CC) User-to-User Object Carousel protocol.

33. The remote DHCT of claim 29, wherein the carousel object is repeatedly broadcast to the gateway device over a plurality of communication channels.

34. The remote DHCT of claim 29, wherein the carousel object comprises electronic program guide (EPG) data.

35. The remote DHCT of claim 34, wherein the television service is an electronic program guide.

36. A gateway device comprising:

a broadcast carousel system (BCS) software application that obtains a carousel object that is repeatedly broadcast to the gateway device using a first protocol and converts the carousel object in the first protocol into a second protocol; and a proxy software application that receives a request for a carousel object from a Remote Digital Home Communication terminal (remote DHCT), that requests the BCS software application to obtain the carousel object based on the received request, and that initiates a transmission of the carousel object from the gateway device to the remote DHCT using the second protocol in response to receiving the request for the BCS software application to obtain the carousel object, wherein the gateway device and the remote DHCT are located at a customer premises.

37. The gateway device of claim 36, further comprising:
a memory device; and
a directory that is stored in the memory device and that lists the carousel object as being available.

38. The gateway device of claim 36, wherein the carousel object comprises software.

39. The gateway device of claim 36, wherein the first protocol is a Digital Storage Media Command and Control (DSM-CC) User-to-User Object Carousel protocol.

40. The gateway device of claim 36, wherein the carousel object is repeatedly broadcast to the gateway device over a plurality of communication channels.

41. The gateway device of claim 36, wherein the carousel object comprises electronic program guide (EPG) data.

42. A gateway device located at a customer premises, comprising:

memory for storing a carousel object; and
a processor that is programmed to:
process a message received from a remote digital home communication terminal (remote DHCT) requesting for the carousel object;

convert the carousel object in a first protocol into a second protocol;

determine whether the carousel object is to be transmitted to the remote DHCT based on the message received from the remote DHCT; and initiate a transmission of the carousel object using the second protocol from the gateway device to the remote DHCT in response to determining that the carousel object is to be transmitted to the remote DHCT, the remote DHCT being capable of processing the carousel object using the second protocol, wherein the gateway device and the remote DHCT are located at a customer premises.

43. The gateway device of claim 42, wherein the carousel object comprises software.

44. The gateway device of claim 42, wherein the carousel object is repeatedly broadcast to the gateway device.

45. The gateway device of claim 42, wherein the first protocol is a Digital Storage Media Command and Control (DSM-CC) User-to-User Object Carousel protocol.

46. The gateway device of claim 42, wherein the carousel object is repeatedly broadcast to the gateway device over a plurality of communication channels.

47. The gateway device of claim 42, wherein the carousel object comprises electronic program guide (EPG) data.

48. A method for providing carousel objects to a remote digital home communication terminal (remote DHCT) via a gateway device, the method comprising:

receiving at the gateway device a message from the remote DHCT requesting a carousel object;

receiving at the gateway device a directory of carousel objects that are available, the object being listed in the directory;

receiving at the gateway device the carousel object, wherein the carousel object is repeatedly broadcast using a first protocol to the gateway device by a data server over a communications network;

caching the carousel object;

converting by the gateway device the carousel object in the first protocol into a second protocol; and responsive to the gateway receiving the message requesting the carousel object from the remote DHCT, transmitting by the gateway device the carousel object from the gateway to the remote DHCT, the remote DHCT being capable of processing the carousel object using the second protocol;

wherein the gateway device and the remote DHCT are located at a customer premises;

wherein the first protocol is a Digital Storage Media Command and Control (DSM-CC) User-to-User Object Carousel protocol;

wherein the carousel object is broadcast to the gateway device over a plurality of communication channels;

wherein the communications network is a satellite television network;

wherein the directory comprises file listings organized in a hierarchical manner;

wherein the carousel object comprises electronic program guide (EPG) data.

* * * * *